US012675941B2

(12) United States Patent
Inomata et al.

(10) Patent No.: US 12,675,941 B2
(45) Date of Patent: \*Jul. 7, 2026

(54) INFORMATION PROCESSING SYSTEM, RADIO WAVE PROPAGATION SIMULATION METHOD, AND PROGRAM

(71) Applicant: NTT, Inc., Tokyo (JP)

(72) Inventors: Minoru Inomata, Tokyo (JP); Wataru Yamada, Tokyo (JP); Nobuaki Kuno, Tokyo (JP); Motoharu Sasaki, Tokyo (JP)

(73) Assignee: NTT, Inc., Tokyo (JP)

( \* ) Notice: Subject to any disclaimer, the term of this patent is extended or adjusted under 35 U.S.C. 154(b) by 302 days.

This patent is subject to a terminal disclaimer.

(21) Appl. No.: 18/548,276

(22) PCT Filed: Apr. 5, 2021

(86) PCT No.: PCT/JP2021/014539
§ 371 (c)(1),
(2) Date: Aug. 29, 2023

(87) PCT Pub. No.: WO2022/215138
PCT Pub. Date: Oct. 13, 2022

(65) Prior Publication Data
US 2024/0135631 A1 Apr. 25, 2024
US 2024/0233245 A9 Jul. 11, 2024

(51) Int. Cl.
*G06T 15/06* (2011.01)
*G06T 15/50* (2011.01)
(Continued)

(52) U.S. Cl.
CPC .............. *G06T 15/06* (2013.01); *G06T 15/50* (2013.01); *G06T 17/05* (2013.01); *G06T 17/20* (2013.01)

(58) Field of Classification Search
CPC .......... H04W 16/18–225; H04B 17/373–3913; G06T 15/06; G06T 17/05
See application file for complete search history.

(56) References Cited

U.S. PATENT DOCUMENTS

2010/0232529 A1* 9/2010 Fettweis ................ H01Q 1/246
375/260
2016/0162613 A1* 6/2016 Shevchenko ........ G01V 1/3808
703/2
2019/0051040 A1* 2/2019 Käfer ..................... G06F 16/29

FOREIGN PATENT DOCUMENTS

JP 2001-168812 6/2001

OTHER PUBLICATIONS

Hussain, Sajjad. Efficient ray-tracing algorithms for radio wave propagation in urban environments. Diss. Dublin City University, 2017. (Year: 2017).*

(Continued)

*Primary Examiner* — Ryan McCulley
(74) *Attorney, Agent, or Firm* — IPUSA, PLLC

(57) ABSTRACT

An information processing system includes: an acquisition unit configured to divide a target area into a plurality of meshes of a predetermined size, and acquire mesh data indicating the environment of the target area with height information about the plurality of meshes on a per-mesh basis; a first ray tracing unit configured to determine a two-dimensional ray trace from a transmission point to a reception point on the basis of the mesh data, a radio wave being transmitted at the transmission point, the radio wave being received at the reception point; a second ray tracing unit configured to determine a three-dimensional ray trace corresponding to the two-dimensional ray trace, on the basis of the mesh data, and height information about the transmission point and the reception point; and a radio field intensity calculation unit configured to calculate an intensity (Continued)

START
├── S601 CREATE MESH DATA FROM ENVIRONMENT DATA
├── S602 READ MESH DATA OF TARGET AREA WITH GPU
├── S603 CALCULATE UNIT VECTOR ñ OF EACH PLANE EXCLUDING CEILING SURFACE, AND UNIT VECTOR l̃ OF EDGE
├── S604 DETERMINE TWO-DIMENSIONAL RAY TRACE WITHIN RANGES OF MAXIMUM NUMBER $N_T$ OF TRANSMISSIONS, MAXIMUM NUMBER $N_R$ OF REFLECTIONS, AND MAXIMUM NUMBER $N_D$ OF DIFFRACTIONS
├── S605 CONVERT TWO-DIMENSIONAL RAY TRACE INTO THREE-DIMENSIONAL RAY TRACE, USING HEIGHT INFORMATION
├── S606 ADD REFLECTED RAY AND/OR DIFFRACTED RAY FROM CEILING SURFACE
└── S607 ADD UP ELECTRIC FIELD INTENSITIES OF ALL RAYS, TO CALCULATE TOTAL ELECTRIC FIELD INTENSITY
END of the radio wave at the reception point, using one or more three-dimensional ray traces determined by the second ray tracing unit.

10 Claims, 18 Drawing Sheets

(51) Int. Cl.
*G06T 17/05*      (2011.01)
*G06T 17/20*      (2006.01)

(56)      References Cited

OTHER PUBLICATIONS

Valenzuela, Reinaldo A. "Ray tracing prediction of indoor radio propagation." 5th IEEE International Symposium on Personal, Indoor and Mobile Radio Communications, Wireless Networks-Catching the Mobile Future . . . vol. 1. IEEE, 1994. (Year: 1994).*
Yamawaki et al. (2003) "Implementation of Indoor Propagation Simulator using 2D-3D Hybrid Ray Tracing Method" Proceedings of the 2003 General Conference of the Institute of Electronics, Information and Communication Engineers, Japan, Mar. 22, 2003, Communications 1, p. 30.
Office Action mailed on Sep. 8, 2025 with respect to the related U.S. Appl. No. 18/284,276.

* cited by examiner

Figure 1:
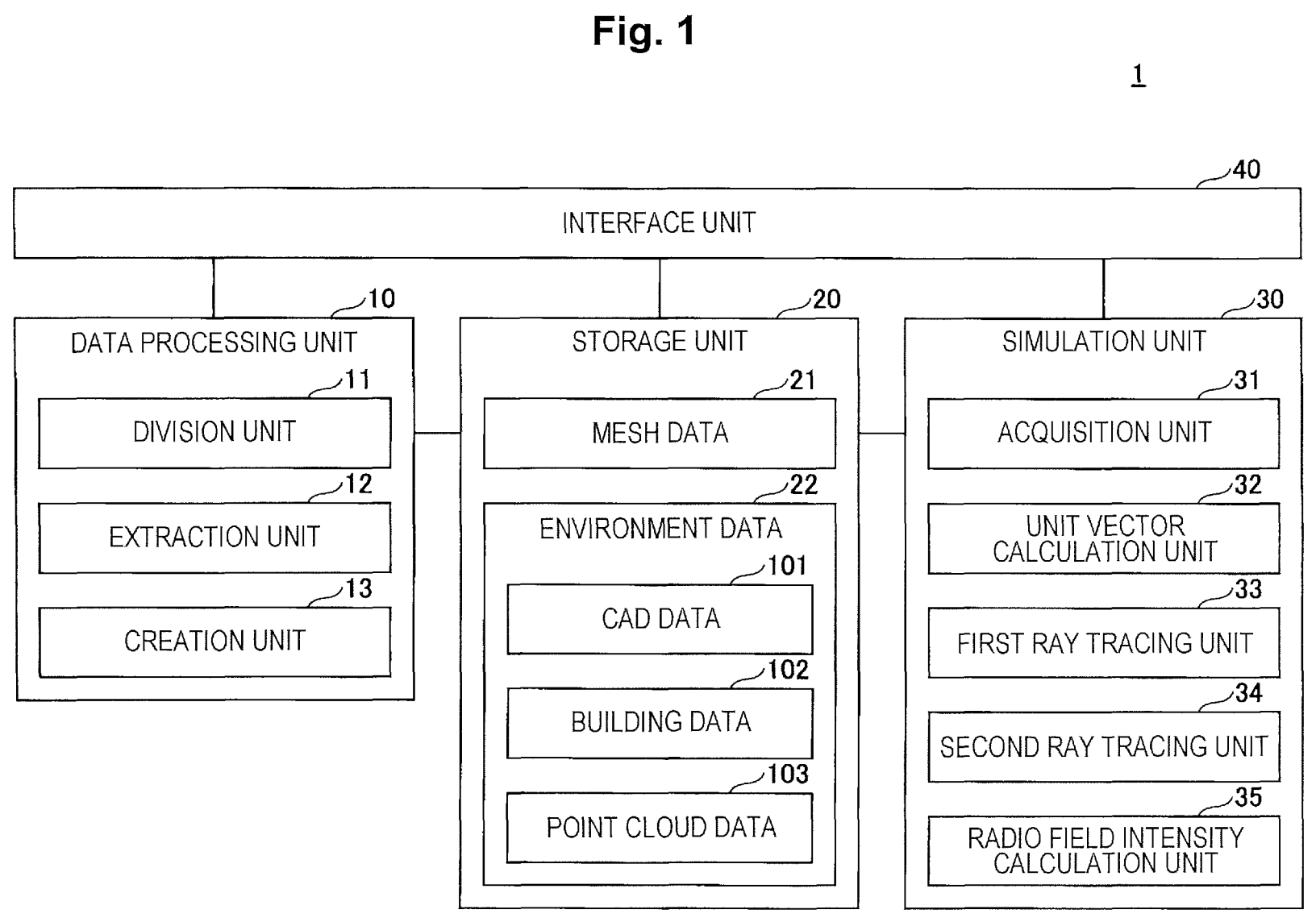

INTERFACE UNIT — 40

DATA PROCESSING UNIT — 10
- DIVISION UNIT — 11
- EXTRACTION UNIT — 12
- CREATION UNIT — 13

STORAGE UNIT — 20
- MESH DATA — 21
- ENVIRONMENT DATA — 22
  - CAD DATA — 101
  - BUILDING DATA — 102
  - POINT CLOUD DATA — 103

SIMULATION UNIT — 30
- ACQUISITION UNIT — 31
- UNIT VECTOR CALCULATION UNIT — 32
- FIRST RAY TRACING UNIT — 33
- SECOND RAY TRACING UNIT — 34
- RADIO FIELD INTENSITY CALCULATION UNIT — 35

| TYPE OF ZONE | DIVISION METHOD | LATITUDE INTERVAL | MERIDIAN INTERVAL | LENGTH OF ONE SIDE | RELATION WITH MAP |
|---|---|---|---|---|---|
| PRIMARY REGIONAL ZONE | ZONES FORMED BY DIVIDING WHOLE AREA OF COUNTRY ALONG LATITUDE LINES AT LATITUDES OBTAINED BY DIVIDING EVEN-NUMBER LATITUDES AND THEIR INTERVAL (120 MIN) BY 3, AND MERIDIANS AT INTERVALS OF 1 DEGREE | 40 MIN | 1 DEGREE | ABOUT 80 km | ZONE EQUIVALENT TO 1 PAGE OF 1/200000 TOPOGRAPHICAL MAP |
| SECONDARY REGIONAL ZONE (INTEGRATED REGION MESH) | ZONES FORMED BY EQUALLY DIVIDING PRIMARY REGIONAL ZONE BY 8 IN LATITUDE DIRECTION AND MERIDIAN DIRECTION | 5 MIN | 7 MIN AND 30 SEC | ABOUT 10 km | ZONE EQUIVALENT TO 1 PAGE OF 1/25000 TOPOGRAPHICAL MAP |
| REFERENCE REGION MESH (TERTIARY REGIONAL ZONE) | ZONES FORMED BY EQUALLY DIVIDING SECONDARY REGIONAL ZONE BY 10 IN LATITUDE DIRECTION AND MERIDIAN DIRECTION | 30 SEC | 45 SEC | ABOUT 1 km | |
| 1/2 REGION MESH (DIVISIONAL REGION MESH) | ZONES FORMED BY EQUALLY DIVIDING REFERENCE REGION MESH (TERTIARY REGIONAL ZONE) BY 2 IN LATITUDE DIRECTION AND MERIDIAN DIRECTION | 15 SEC | 22.5 SEC | ABOUT 500 m | |
| 1/4 REGION MESH (DIVISIONAL REGION MESH) | ZONES FORMED BY EQUALLY DIVIDING 1/2 REGION MESH BY 2 IN LATITUDE DIRECTION AND MERIDIAN DIRECTION | 7.5 SEC | 11.25 SEC | ABOUT 250 m | |

Fig. 6

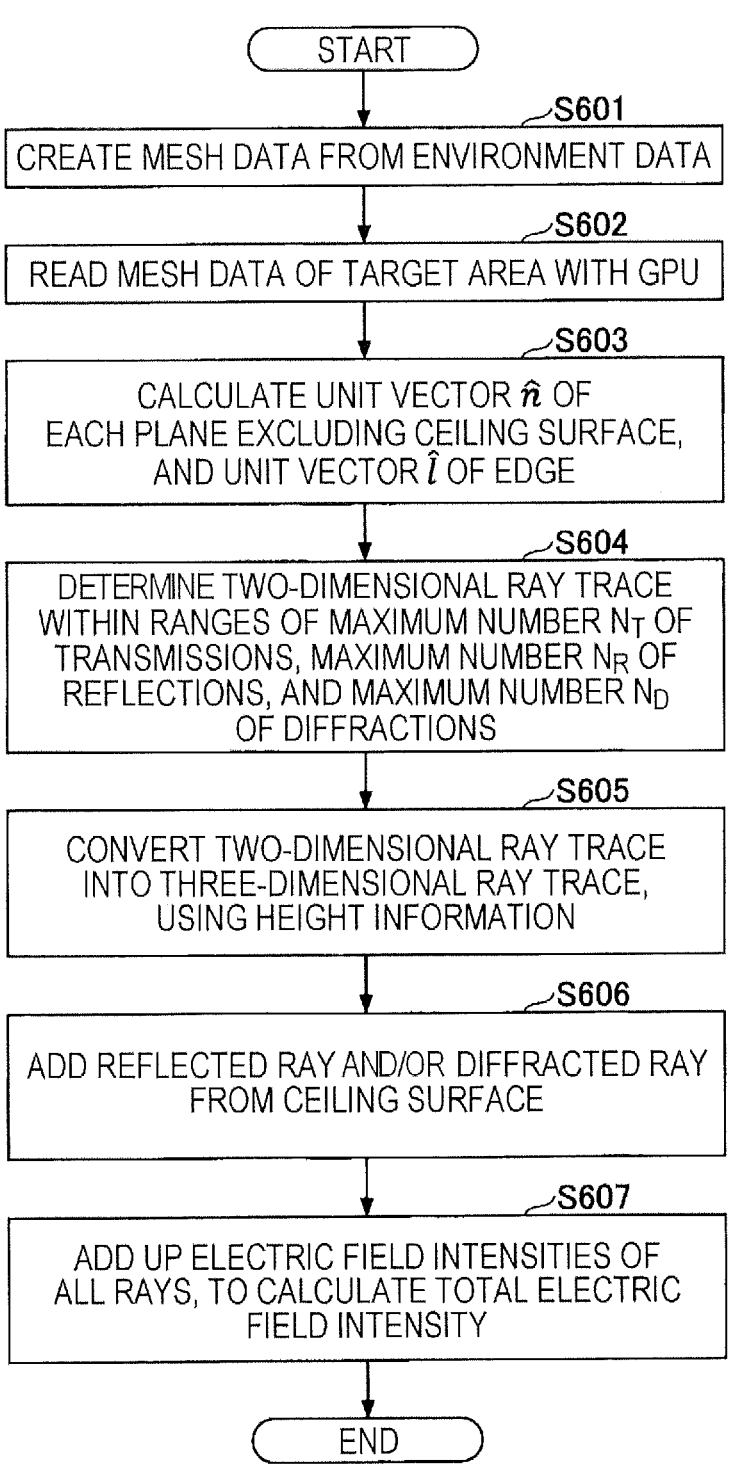

START

S601

CREATE MESH DATA FROM ENVIRONMENT DATA

S602

READ MESH DATA OF TARGET AREA WITH GPU

S603

CALCULATE UNIT VECTOR $\hat{n}$ OF
EACH PLANE EXCLUDING CEILING SURFACE,
AND UNIT VECTOR $\hat{l}$ OF EDGE

S604

DETERMINE TWO-DIMENSIONAL RAY TRACE
WITHIN RANGES OF MAXIMUM NUMBER $N_T$ OF
TRANSMISSIONS, MAXIMUM NUMBER $N_R$ OF
REFLECTIONS, AND MAXIMUM NUMBER $N_D$
OF DIFFRACTIONS

S605

CONVERT TWO-DIMENSIONAL RAY TRACE
INTO THREE-DIMENSIONAL RAY TRACE,
USING HEIGHT INFORMATION

S606

ADD REFLECTED RAY AND/OR DIFFRACTED RAY
FROM CEILING SURFACE

S607

ADD UP ELECTRIC FIELD INTENSITIES OF
ALL RAYS, TO CALCULATE TOTAL ELECTRIC
FIELD INTENSITY

END

LEAVE DIFFRACTED RAY OF
UNIT DIRECTIONAL VECTOR $\hat{r}_D$
SATISFYING EQUATION BELOW $$\hat{l} \cdot \hat{r}_D = \hat{l} \cdot \hat{r}_{in}$$

LEAVE REFLECTED RAY OF
UNIT DIRECTIONAL VECTOR $\hat{r}_R$
SATISFYING EQUATION BELOW $$\hat{r}_R = \hat{r}_{in} - 2(\hat{n} \cdot \hat{r}_{in})\,\hat{n}$$

Fig. 8

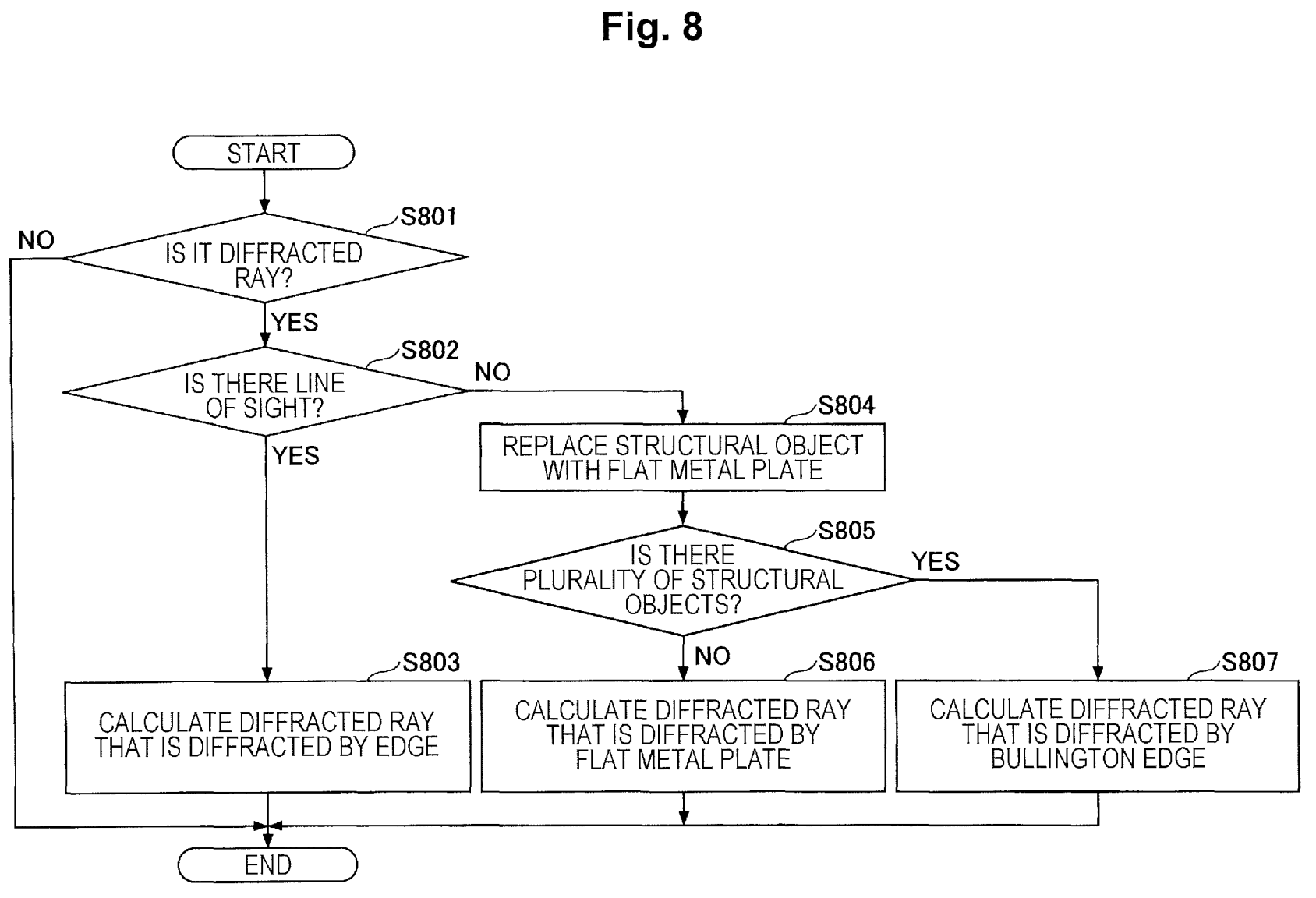

START

S801 — IS IT DIFFRACTED RAY?

NO

YES

S802 — IS THERE LINE OF SIGHT?

NO

YES

S804 — REPLACE STRUCTURAL OBJECT WITH FLAT METAL PLATE

S805 — IS THERE PLURALITY OF STRUCTURAL OBJECTS?

YES

NO

S807 — CALCULATE DIFFRACTED RAY THAT IS DIFFRACTED BY BULLINGTON EDGE

S806 — CALCULATE DIFFRACTED RAY THAT IS DIFFRACTED BY FLAT METAL PLATE

S803 — CALCULATE DIFFRACTED RAY THAT IS DIFFRACTED BY EDGE

END

LINE-OF-SIGHT DETERMINATION IN HORIZONTAL PLANE

LINE-OF-SIGHT DETERMINATION IN VERTICAL PLANE
(NO LINE OF SIGHT IS PRESENT)

LINE-OF-SIGHT DETERMINATION IN VERTICAL PLANE
(LINE OF SIGHT IS PRESENT)

CASE WHERE LINE OF SIGHT IS PRESENT IN VERTICAL PLANE

INFORMATION PROCESSING SYSTEM, RADIO WAVE PROPAGATION SIMULATION METHOD, AND PROGRAM

TECHNICAL FIELD

The present invention relates to an information processing system, a radio wave propagation simulation method, and a program.

BACKGROUND ART

As a method for performing a radio wave propagation simulation to be used for area evaluation and the like in a wireless communication system, there is ray tracing. In ray tracing, how radio waves (rays) transmitted from the transmission point are reflected, diffracted, or transmitted by a structural object that is present on the way to the reception point, and reach the reception point is tracked (traced) as trajectories of the respective rays, and the powers of all the rays that have reached the reception point are added up, to estimate the intensity of the radio waves at the reception point.

Also, there is a known indoor wireless communication system that uses ray tracing in simulating traveling/propagation characteristics between a wireless base station and a terminal station, and reduces electromagnetic interference on the basis of a simulation result (see Patent Literature 1, for example).

CONVENTIONAL ART LITERATURE

Patent Literature

Patent Literature 1: Japanese Patent Application Publication No. 2001-168812

SUMMARY OF INVENTION

Problem to be Solved by Invention

By the conventional technology, in a case where ray tracing is performed in an environment such as an indoor environment in which many structural objects exist, for example, reflection or diffraction is repeated by many structural objects until rays reach the reception point, resulting in an increase in the calculation amount.

Further, there are various formats of environment data to be used in radio wave propagation simulations. Therefore, it takes a long time to read the environment data by the conventional technology, which hinders an increase in the speed of radio wave propagation simulations.

An embodiment of the present invention has been made in view of the above problems, and is to provide an information processing system that reduces the increase in the amount of calculation in a radio wave propagation simulation, and increases the speed of the radio wave propagation simulation.

Means for Solving Problem

To solve the above problems, an information processing system according to an embodiment of the present invention includes: an acquisition unit configured to divide a target area into a plurality of meshes of a predetermined size, and acquire mesh data indicating an environment of the target area with height information about the plurality of meshes on a per-mesh basis; a first ray tracing unit configured to determine a two-dimensional ray trace from a transmission point to a reception point on the basis of the mesh data, a radio wave being transmitted at the transmission point, the radio wave being received at the reception point; a second ray tracing unit configured to determine a three-dimensional ray trace corresponding to the two-dimensional ray trace, on the basis of the mesh data, and height information about the transmission point and the reception point; and a radio field intensity calculation unit configured to calculate an intensity of the radio wave at the reception point, using one or more of three-dimensional ray traces determined by the second ray tracing unit.

Advantageous Effects of Invention

It is possible to provide an information processing system that reduces the increase in the amount of calculation in a radio wave propagation simulation, and increases the speed of the radio wave propagation simulation.

BRIEF DESCRIPTION OF DRAWINGS

FIG. 1 is a diagram illustrating an example of a configuration of an information processing system according to the present embodiment.

FIG. 3 is a table showing a region mesh division method.

FIG. 6 is a flowchart illustrating an example of a ray tracing process according to Example 1.

FIG. 8 is a flowchart illustrating an example of a diffracted ray calculation process according to Example 2.

MODE FOR CARRYING OUT INVENTION

Figure 2A:
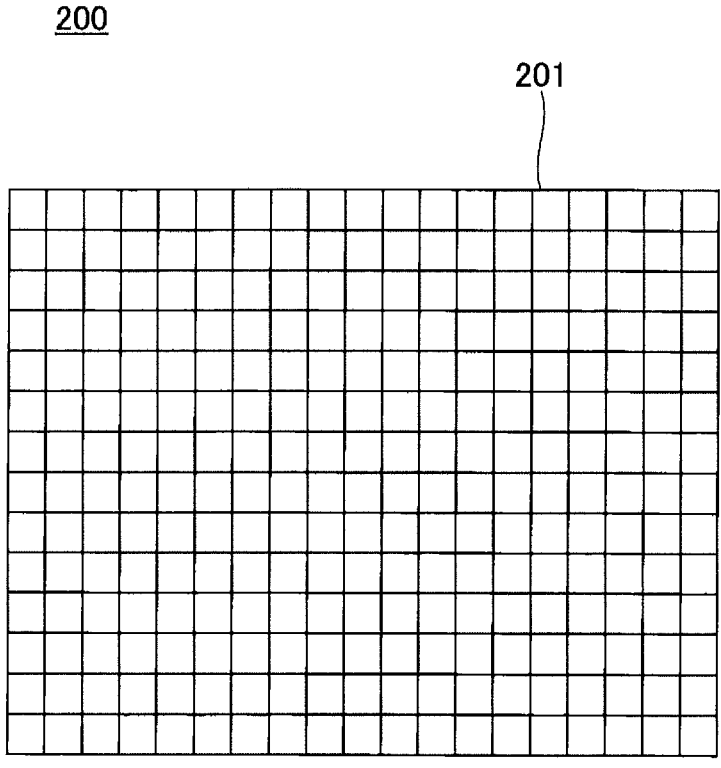
FIG. 2A is a diagram (1) for explaining an outline of data processing according to the present embodiment.

The following is a description of an embodiment (the present embodiment) of the present invention, with reference to the drawings. The embodiment described below is merely an example, and embodiments to which the present invention is applied are not limited to the embodiment described below.

<System Configuration>

FIG. 1 is a diagram illustrating an example of a configuration of an information processing system according to the present embodiment. In an information processing system 1, a computer included in the information processing system 1 executes a predetermined program, for example, to form a data processing unit 10, a storage unit 20, a simulation unit 30, an interface unit 40, and the like. Note that each of the functional components mentioned above is not necessarily formed with a program that is executed by a physical machine (a computer), but may be formed with a program that is executed by a virtual machine in a cloud. Alternatively, the respective functional components mentioned above may be scattered in separate physical machines or virtual machines.

The storage unit 20 stores in advance environment data 22 of the target area to be subjected to a radio wave propagation simulation. The environment data 22 may include computer aided design (CAD) data 101, building data 102, and point cloud data 103, for example.

The CAD data 101 is three-dimensional CAD data that includes data indicating the widths, the heights, the shapes, the positions, and the like of the respective surfaces of objects (structural objects, buildings, and the like) present in the target area, and information such as the reflectances and transmittances of radio waves on the respective surfaces, for example. The CAD data 101 may be data that is input to a three-dimensional CAD system or the like by an operator or the like, or may be data that is obtained by converting three-dimensional environment map data or the like created by a simultaneous localization and mapping (SLAM) technology, into CAD data or the like, for example.

The building data 102 is a database (a building database) that includes data indicating the widths, the heights, the shapes, the positions, and the like of the respective surfaces of the buildings present in the target area, and information such as the reflectances of radio waves on the respective surfaces. In the present embodiment, the building data 102 includes information about the respective surfaces such as walls, floors, ceilings, columns, and the like inside the building. The point cloud data 103 is three-dimensional point cloud data that is acquired through LIDAR or the like, and indicates the distances or the like to the respective points of a certain object present in the target area. Alternatively, the point cloud data 103 may be three-dimensional environment map data or the like that is created on the basis of three-dimensional point cloud information by a simultaneous localization and mapping (SLAM) technology.

Note that the storage unit 20 may be formed with a storage server outside the information processing system 1, a cloud service, or the like, for example.

(Data Processing Unit)

The data processing unit 10 creates mesh data of a predetermined area for which the simulation unit 30 performs radio wave propagation simulations, using the environment data 22 such as the CAD data 101, the building data 102, or the point cloud data 103, for example. The data processing unit 10 includes a division unit 11, an extraction unit 12, and a creation unit 13, for example.

The division unit 11 divides the target area to be subjected to a radio wave propagation simulation, into meshes, for example. For example, as illustrated in FIG. 2A, the division unit 11 divides a target area 200 into meshes 201 of a predetermined size. In an example, the division unit 11 divides the target area into meshes 201, on the basis of region meshes obtained by dividing an area into mesh zones in accordance with latitude and longitude.

FIG. 3 illustrates a region mesh division method disclosed on the homepage of Statistics Bureau of Japan (https://www.stat.go.jp/data/mesh/m_tuite.html). In an example, the division unit 11 divides the target area 200 into the meshes 201 in accordance with the region mesh division method illustrated in FIG. 3. Note that, by the region mesh division method illustrated in FIG. 3, only up to ¼ region meshes are defined, but the division unit 11 may extend the region mesh division method illustrated in FIG. 3 to ⅛ region meshes, 1/16 region meshes, . . . , or the like, for example, depending on a predetermined size.

In another example, the division unit 11 may divide the target area 200 into the meshes 201 on the basis of relative coordinates or the like of the CAD data 101, in a case where latitude and longitude information is not required by the simulation unit 30 to perform an indoor radio wave propagation simulation.

Referring now back to FIG. 1, explanation of the functional components of the data processing unit 10 is continued. The extraction unit 12 extracts, from the environment data 22, height information about each of the meshes 201 as illustrated in FIG. 2A, for example. For example, the extraction unit 12 analyzes the CAD data 101, and, in a case where a structural object of three meters in height is present in a mesh 201, sets the height information about the mesh 201 to three meters. Note that, in a case where the height information about the mesh 201 cannot be obtained, the extraction unit 12 may analyze some other data in the environment data 22, such as the building data 102, and extract the height information about the subject mesh 201, for example. Further, in a case where the extraction unit 12 analyzes the environment data 22 and cannot obtain the height information about the mesh 201, the extraction unit 12 sets the height information about the subject mesh 201 to zero.

Figure 2B:
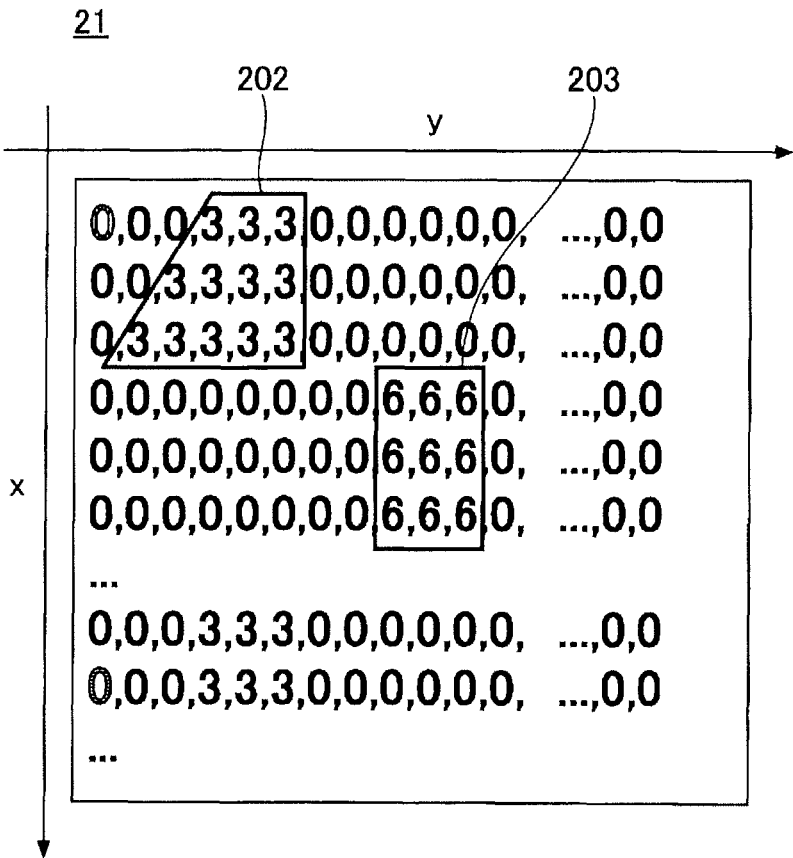
FIG. 2B is a diagram (2) for explaining an outline of data processing according to the present embodiment.

The creation unit 13 creates mesh data 21 as illustrated in FIG. 2B, for example, using the height information about each mesh 211 extracted by the extraction unit 12. In the mesh data 21 illustrated in FIG. 2B, the x and y directions correspond to the positions (such as the latitudes and the longitudes, or rows and columns, for example) of the respective meshes 201, and the values of the respective pieces of data indicate the height information about the respective meshes 201. Accordingly, the mesh data 21 indicates that a structural object of three meters in height is present in an area 202 having height information of "3", and a structural object of six meters in height is present in an area 203 having height information of "6", for example. It is also indicated that no structural objects are present in the area having height information of "0", for example.

Thus, the data processing unit 10 can convert the data that is included in the environment data 22 stored in the storage unit 20 and indicates the widths, the heights, the shapes, the positions, and the like of the respective surfaces of the objects (such as structural objects and buildings) present in the target area, into two-dimensional mesh data 21 as illustrated in FIG. 2B. Further, this mesh data 21 has a format of image data, and thus has a characteristic of enabling high-speed reading and processing with use of a graphics processing unit (GPU).

Furthermore, the mesh data 21 can be reused. Accordingly, in a case where the simulation unit 30 performs a radio wave propagation simulation in the target area for the second time and later, the data processing unit 10 can skip the process of creating the mesh data 21.

(Simulation Unit)

The simulation unit 30 reads the mesh data 21 created by the data processing unit 10 from the storage unit 20 or the like, and performs a radio wave propagation simulation on the target area. The description below is based on the assumption that the simulation unit 30 performs a radio wave propagation simulation on the target area through ray tracing. In the ray tracing, how radio waves (rays) transmitted from the transmission point are reflected, diffracted, or transmitted by a structural object that is present on the way to the reception point, and reach the reception point is tracked (traced) as trajectories of the respective rays, and the powers of all the rays that have reached the reception point are added up, to estimate the intensity of the radio waves at the reception point.

However, according to the conventional technology, in a case where ray tracing is performed in an environment such as an indoor environment in which many indoor structural objects exist, for example, reflection, diffraction, or transmission is repeated by many structural objects until rays reach the reception point. Therefore, the calculation amount increases, and the processing speed drops.

To solve the above problem, the simulation unit 30 according to the present embodiment includes an acquisition unit 31, a unit vector calculation unit 32, a first ray tracing unit 33, a second ray tracing unit 34, and a radio field intensity calculation unit 35, for example.

The acquisition unit 31 acquires the mesh data 21 of the target area of ray tracing, from the storage unit 20 or the like, for example. Preferably, the acquisition unit 31 reads the mesh data 21 from the storage unit 20 at a high speed, using a GPU included in the computer.

The unit vector calculation unit 32 calculates the unit vector of each plane excluding the ceiling surface and the unit vector of an edge, using the mesh data 21 acquired by the acquisition unit 31. For example, the mesh data 21 indicates structural objects in the building and the inside of the building (such as walls, floors, and columns, for example) excluding the ceiling, as planes. The unit vector calculation unit 32 calculates the unit vector of each of these planes, and the unit vector of each edge formed by the planes intersecting with each other. Note that the functions of the unit vector calculation unit 32 may be included in the first ray tracing unit 33 or the like, for example.

The first ray tracing unit 33 determines a two-dimensional ray trace from the transmission point at which radio waves are transmitted to the reception point at which the radio waves are received, on the basis of the mesh data 21. For example, the first ray tracing unit 33 emits a two-dimensional ray in a horizontal direction from the transmission point, and traces the two-dimensional ray to the reception point.

The second ray tracing unit 34 determines a three-dimensional ray trace corresponding to the two-dimensional ray trace determined by the first ray tracing unit 33, on the basis of the mesh data 21 and height information about the transmission point and the reception point. For example, the second ray tracing unit 34 converts the two-dimensional ray trace obtained by the first ray tracing unit 33 into a three-dimensional ray trace, on the basis of height information (antenna heights) about the transmission point and the reception point, and height information about structural objects.

Preferably, when determining a three-dimensional ray trace, the second ray tracing unit 34 determines a reflected ray or a diffracted ray by restricting the launch angle of ray launching, on the basis of the Fermat's theorem, for example.

Further, in a case where there is not a line of sight between the transmission point and the reception point, the second ray tracing unit 34 replaces the structural object existing between the transmission point and the reception point with a flat metal plate, for example, and determines a diffracted ray that is screen-diffracted by the flat metal plate.

Preferably, in a case where there is a plurality of structural objects between the transmission point and the reception point, the second ray tracing unit 34 adopts the Bullington model recommended in ITU-R Recommendations (ITU-R Recommendation p. 526, "Propagation by diffraction"), to determine a diffracted ray that is diffracted by the plurality of structural objects.

Also, using the building data 102, for example, the second ray tracing unit 34 adds a reflected ray or a diffracted ray from the ceiling surface of the building to the three-dimensional ray trace determined on the basis of the mesh data 21.

The radio field intensity calculation unit 35 calculates the intensity of the radio wave at the reception point, using one or more three-dimensional ray traces determined by the second ray tracing unit 34. For example, the radio field intensity calculation unit 35 calculates the reflection coefficient and the diffraction coefficient with respect to one or more three-dimensional ray traces determined by the second ray tracing unit 34, and adds up the electric field intensities of the respective rays, to calculate the total electric field intensity.

As described above, in the simulation unit 30, the acquisition unit 31 can acquire the mesh data 21, which is environment data, from the storage unit 20 at a high speed, using a GPU.

Also, in the simulation unit 30, the first ray tracing unit 33 determines a two-dimensional ray trace from the transmission point to the reception point, and the second ray tracing unit 34 determines a three-dimensional ray trace corresponding to the two-dimensional ray trace. In a case where the intensity of the radio wave at the reception point is estimated from ray tracing, the number of rays contributing to the intensity of the radio wave is normally small, and most of the rays are discarded according to conventional technologies. On the other hand, the information processing system 1 according to the present embodiment searches for principal rays, and thus, can speed up ray tracing without a decrease in precision.

Further, when determining a three-dimensional ray trace corresponding to a two-dimensional ray trace, the simulation unit 30 restricts the launch angle of ray launching, to determine a reflected ray or a diffracted ray. Thus, the information processing system 1 can reduce the number of rays to be searched for, and further speed up the ray tracing.

Furthermore, when determining a diffracted ray that is diffracted by a plurality of structural objects present between the transmission point and the reception point, the simulation unit 30 adopts the Bullington model, to determine a diffracted ray that is diffracted by the plurality of structural objects. As the Bullington model is simpler and faster in calculation speed than other methods, the information processing system 1 can further speed up ray tracing.

The interface unit 40 provides an application programming interface (API) for another system to use the various functions provided by the information processing system 1, a user interface (UI) for a user to use the functions, and the like. For example, the user (or another system) can use the interface unit 40 to request the data processing unit 10 to create the mesh data 21, or to request for execution of a radio wave propagation simulation and the like. Also, the user (or another system) can use the interface unit 40 to set parameters (such as the position of the transmission point, the position of the reception point, the frequency, and the transmission power, for example) necessary for a radio wave propagation simulation, or to register the environment data 22 and the like in the storage unit 20.

With the above configuration, the present embodiment can provide the information processing system 1 that reduces the increase in the amount of calculation in a radio wave propagation simulation, and increases the speed of the radio wave propagation simulation.

<Process Flow>

Next, a process flow by a propagation environment data processing method according to the present embodiment is described.

Example 1

(Data Processing 1)

Figure 4:
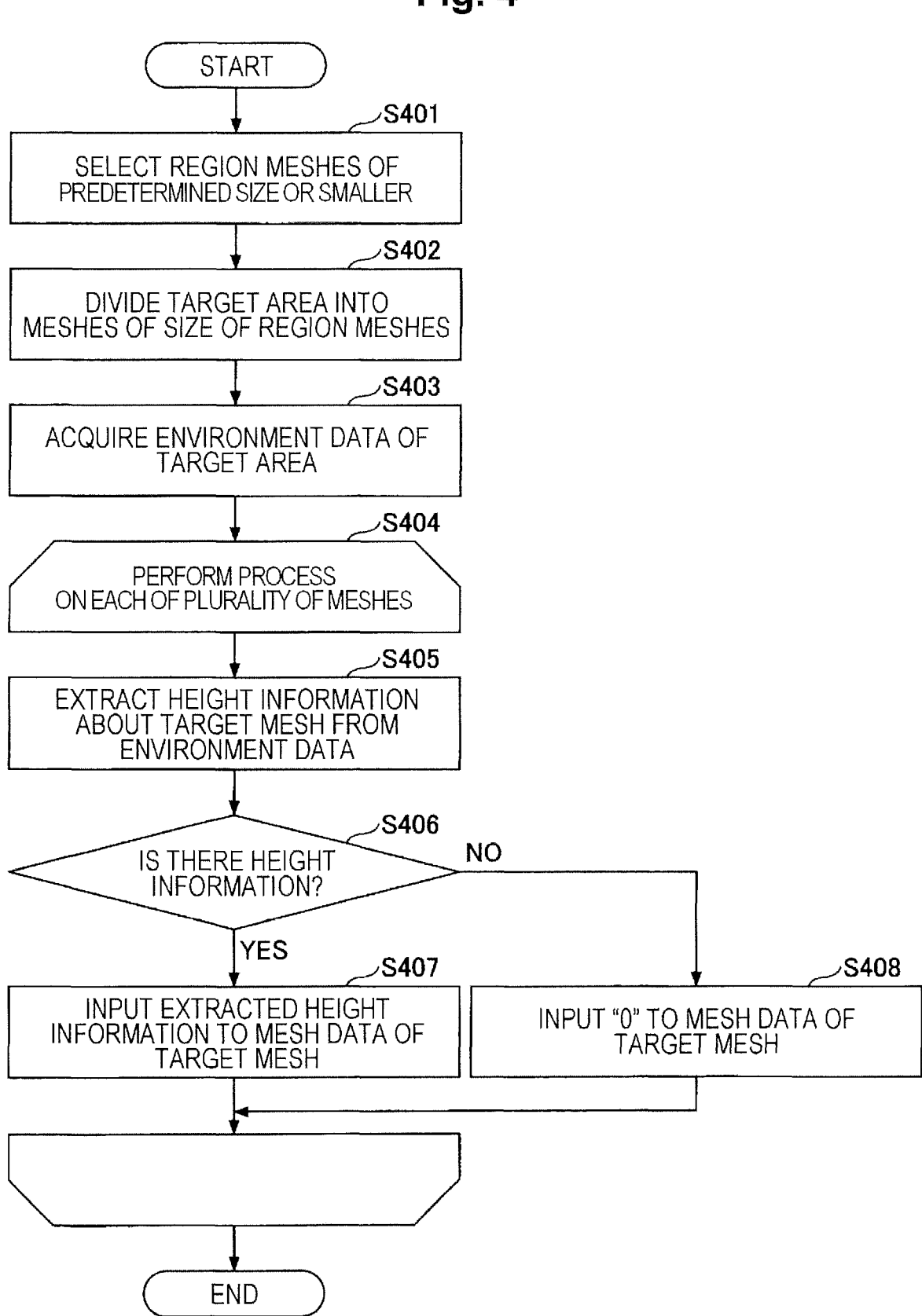
FIG. 4 is a flowchart illustrating an example of data processing according to Example 1.

FIG. 4 is a flowchart illustrating an example of data processing according to Example 1. This processing is an example of data processing in which the data processing unit 10 creates the mesh data 21, using the environment data 22.

In step S401, the division unit 11 of the data processing unit 10 selects region meshes of a predetermined size or smaller from among the region meshes shown in FIG. 3, for example, or extended region meshes (for example, ⅛ region meshes, 1/16 region meshes, and the like). Here, the predetermined size may be set by a user, another system, or the like via the simulation unit 30, for example, or may be set beforehand in the data processing unit 10.

In step S402, the division unit 11 divides the target area to be processed, into a plurality of meshes of the size of the region meshes. For example, as illustrated in FIG. 2A, the division unit 11 divides the target area 200 into a plurality of meshes 201 having the size of the region meshes selected in step S401.

In step S403, the extraction unit 12 of the data processing unit 10 acquires the environment data 22 of the target area from the storage unit 20, for example. Note that, in a case where the environment data 22 uses relative coordinates, instead of latitude and longitude, latitude and longitude information about one point in the environment data 22 is acquired beforehand, and is stored in the environment data 22, for example. In this manner, the data processing unit 10 can associate the relative coordinates of the environment data 22 with latitude and longitude.

In step S404, the data processing unit 10 executes steps S405 to S408 on the respective meshes of the plurality of meshes 201.

In step S405, the extraction unit 12 of the data processing unit 10 extracts, from the environment data 22, the height information about the target mesh 201 of the plurality of meshes 201. Note that, in a case where there is a plurality of sets of environment data 22, such as the CAD data 101, the building data 102, and the point cloud data 103, the priority levels of the respective sets of data are preferably determined in advance. In this case, the extraction unit 12 may try to acquire the height information from data having a higher priority level, and extract the height information that can be acquired first.

In step S405, the creation unit 13 of the data processing unit 10 determines whether the environment data 22 includes the height information about the target mesh 201. For example, in a case where the extraction unit 12 has been able to acquire the height information from the environment data 22, the creation unit 13 determines that there is the height information. In a case where the extraction unit 12 has failed to acquire the height information from the environment data 22, on the other hand, the creation unit 13 determines that there is no height information. If there is the height information, the creation unit 13 proceeds to step S407. If there is no height information, on the other hand, the creation unit 13 proceeds to step S408.

When having proceeded to step S407, the creation unit 13 inputs the height information extracted by the extraction unit 12 to the mesh data of the target mesh 201. When having proceeded to step S408, on the other hand, the creation unit 13 inputs "0" to the mesh data of the target mesh 201.

The data processing unit 10 can create the mesh data 21 as illustrated in FIG. 2B, for example, by executing steps S405 to S408 on the respective meshes of the plurality of meshes 201.

(Data Processing 2)

Figure 5:
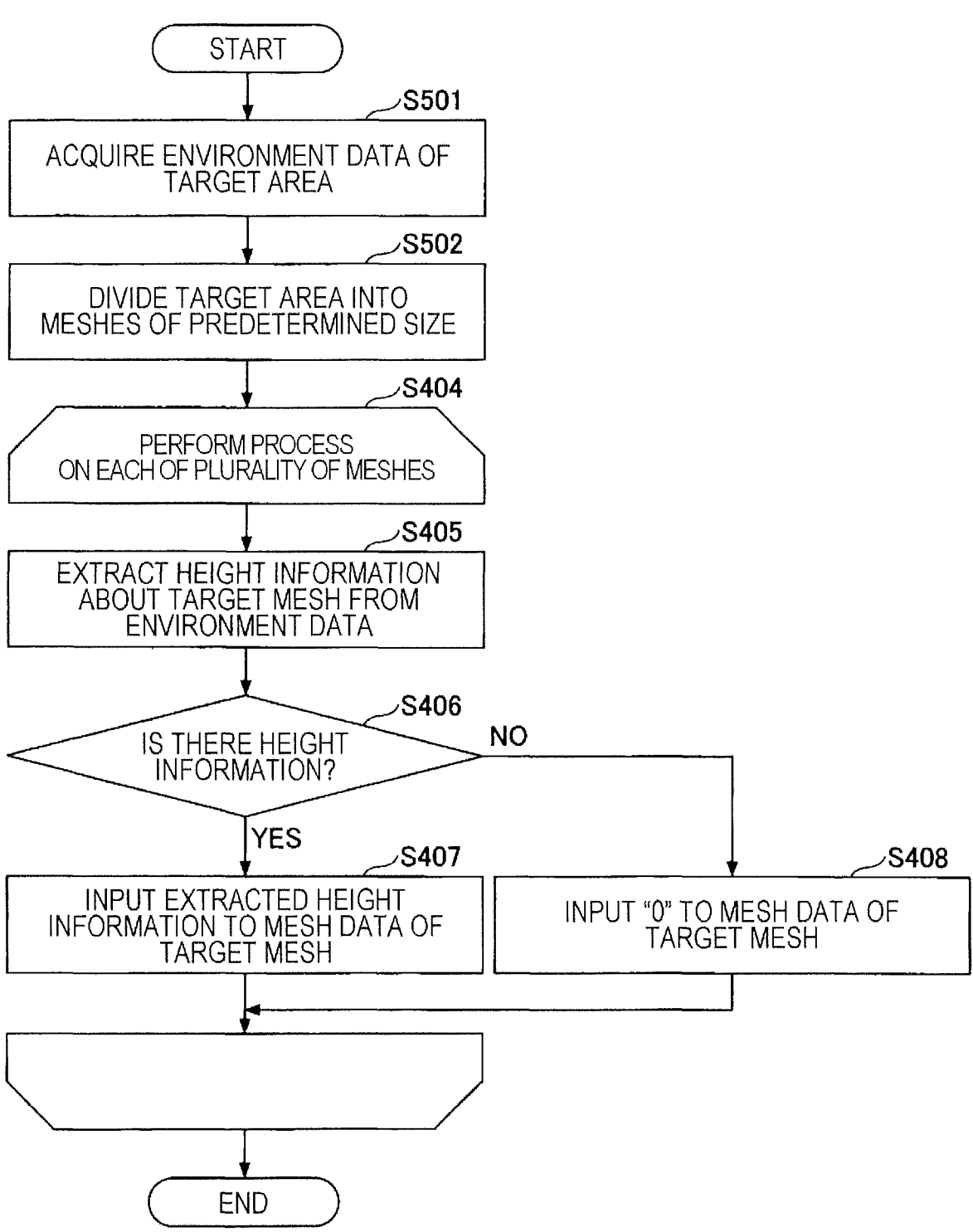
FIG. 5 is a flowchart illustrating another example of data processing according to Example 1.

FIG. 5 is a flowchart illustrating an example of data processing according to Example 2. This processing is another example of data processing in which the data processing unit 10 creates the mesh data 21, using the environment data 22.

The process described above with reference to FIG. 4 is an example of a case where the data processing unit 10 divides the target area into region meshes as shown in FIG. 3, for example. However, the present embodiment is not limited to this example, and the data processing unit 10 may divide the target area into a plurality of meshes of a predetermined size, on the basis of relative coordinates or the like with respect to the environment data 22 (such as the CAD data 101), for example.

For example, in a case where an indoor radio wave propagation simulation in a building or the like is performed, latitude and longitude information is not required in many cases. Furthermore, many indoor structural objects are disposed along wall surfaces or pillars of a building. Therefore, there is a case where it is better to divide the target area into areas of a predetermined size, on the basis of relative coordinates with respect to the environment data 22.

In the example of a case of processing described herein, the data processing unit 10 divides the target area into a plurality of meshes of a predetermined size, on the basis of the relative coordinates or the like with respect to the environment data 22, for example. Note that, among the processes illustrated in FIG. 5, the processes of steps S404 to S408 are the same as the processes described with reference to FIG. 4, and therefore, the differences from the processes described with reference to FIG. 4 are mainly described herein.

In step S501, the division unit 11 of the data processing unit 10 acquires the environment data 22 of the target area from the storage unit 20, for example. For example, in a case where a radio wave propagation simulation is performed on a certain floor in a building, the division unit 11 acquires the environment data 22 of that floor.

In step S502, the division unit 11 divides the target area into meshes of a predetermined size. For example, on the basis of the relative coordinates with respect to the acquired environment data 22 (the CAD data 101, for example), the division unit 11 divides the target area 200 into a plurality of meshes 201 of a predetermined size as illustrated in FIG. 2A.

In step S404, the data processing unit 10 executes steps S405 to S408 on the respective meshes of the plurality of meshes 201. In this manner, the data processing unit 10 can create the mesh data 21 as illustrated in FIG. 2(B), for example.

(Ray Tracing Process)

FIG. 6 is a flowchart showing an example of a ray tracing process according to Example 1. Note that an example of a process in a case where ray tracing is performed in an indoor environment is described herein. As ray tracing algorithms, the imaging method and the ray-launching method are generally known, and an example of a process by the ray-launching method is described herein. By the ray-launching method, a ray is emitted from the transmission point at each predetermined angle, and the trajectories are geometrically tracked while intersection determination with a wall surface or an edge of the wall surface is performed for each emitted ray. Thus, the rays that have reached the reception point are determined.

In step S601, the data processing unit 10 creates the mesh data 21 from the environment data 22 by performing the data processing described above with reference to FIG. 4 or FIG. 5, for example. Note that, in a case where the mesh data 21 has already been created, the data processing unit 10 can skip step S601. Alternatively, the data processing unit 10 may execute step S601 beforehand at some other timing (such as during batch processing at night, for example).

In step S602, the acquisition unit 31 reads, from the storage unit 20 or the like, the mesh data 21 of the target area to be subjected to ray tracing, using a GPU.

In step S603, the unit vector calculation unit 32 calculates the unit vector of each plane excluding the ceiling surface and the unit vector of an edge in the target area of ray tracing, using the mesh data 21 acquired by the acquisition unit 31.

In step S604, the first ray tracing unit 33 determines a two-dimensional ray trace from the transmission point at which radio waves are transmitted to the reception point at which the radio waves are received, on the basis of the mesh data 21. For example, the first ray tracing unit 33 emits two-dimensional rays from the transmission point in a horizontal direction, and traces the two-dimensional rays that reach the reception point within the ranges of a maximum number $N_T$ of transmissions, a maximum number $N_R$ of reflections, and a maximum number $N_D$ of diffractions. As a result, a two-dimensional ray trace that does not take into consideration reflection from the ceiling and the floor surface is determined.

Note that the maximum number $N_T$ of transmissions, the maximum number $N_R$ of reflections, and the maximum number $N_D$ of diffractions may be set with the use of the interface unit 40 or the like, for example, before the start of ray tracing, for example. Alternatively, in a case where the values of the maximum number $N_R$ of reflections and the maximum number $N_D$ of diffractions have not been set, the first ray tracing unit 33 may determine a two-dimensional ray trace, using default values ($N_T=1$, $N_R=1$, and $N_D=1$, for example).

In step S605, the second ray tracing unit 34 converts the two-dimensional ray trace, which has been determined by the first ray tracing unit 33 in step S604, into a three-dimensional ray trace.

Figure 7:
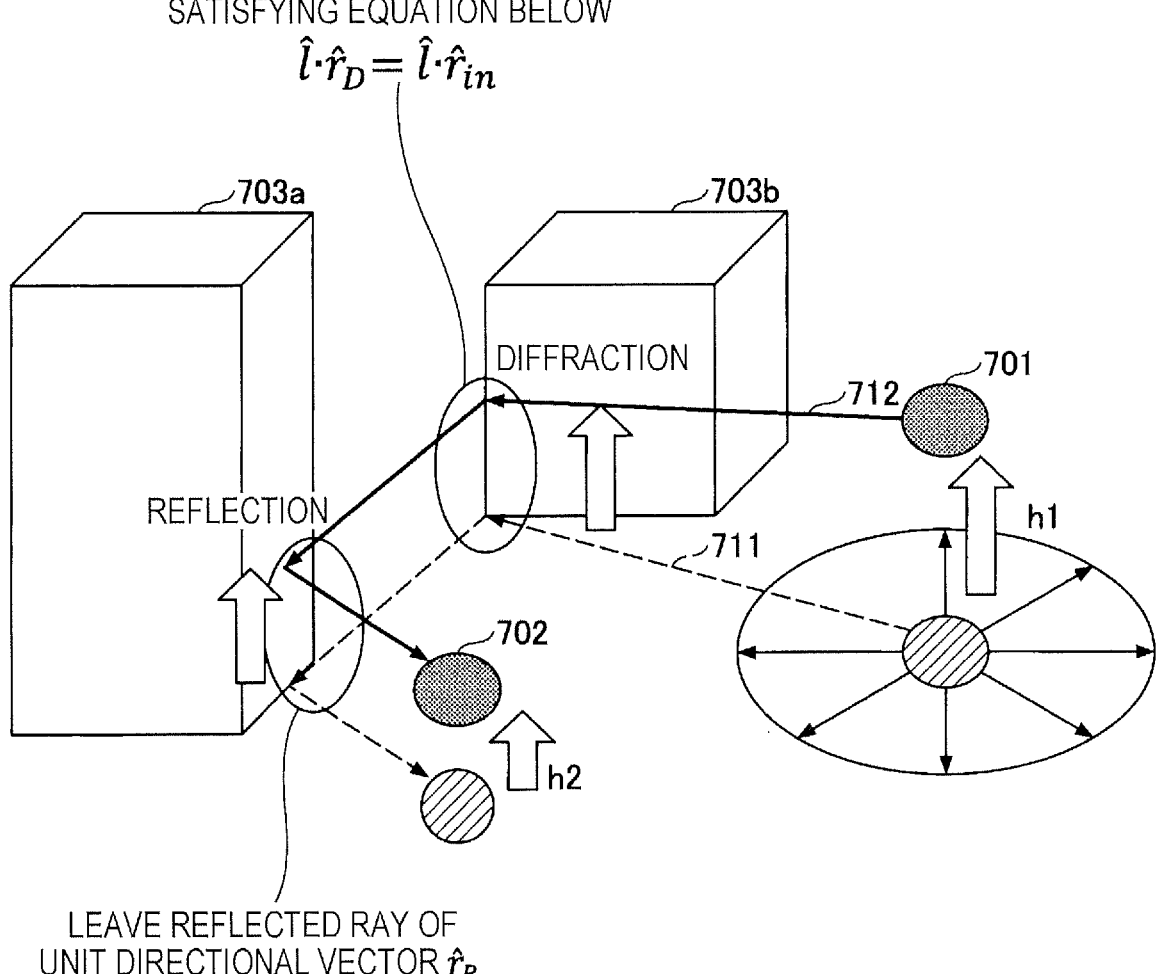
FIG. 7 is a diagram for explaining a three-dimensional ray trace according to Example 1.

FIG. 7 is a diagram for explaining a three-dimensional ray trace according to Example 1. In FIG. 7, dashed-line arrows indicate an example of a two-dimensional ray trace 711 determined by the first ray tracing unit 33. The two-dimensional ray trace 711 is a two-dimensional ray trace in which a two-dimensional ray emitted from the transmission point is diffracted at an edge of a structural object 703*b*, is then reflected on a plane of a structural object 703*a*, and reaches the reception point.

Two-dimensional ray traces to be determined by the first ray tracing unit 33 include not only the above, but also a two-dimensional ray trace that directly reaches the reception point from the transmission point, and a two-dimensional ray trace that is reflected, diffracted, or transmitted by another structural object, a wall of the building, or the like and then reaches the reception point. Here, the two-dimensional ray trace 311 that is reflected once and is diffracted once is illustrated as an example for explanation.

The second ray tracing unit 34 adds the height h1 of a transmission point 701, the height h2 of a reception point 702, the heights of the structural objects 703*a* and 703*b*, and the like to the two-dimensional ray trace 711 illustrated in FIG. 7, for example, to determine a three-dimensional ray trace 712 corresponding to the two-dimensional ray trace 711.

For example, the second ray tracing unit 34 causes a three-dimensional ray intersecting a plane of the structural object 703*a* or the like to re-emit in the reflection direction. At this point of time, on the basis of the Fermat's theorem, the second ray tracing unit 34 leaves a reflected ray of a unit directional vector $r_R{}^{\wedge}$ that satisfies Expression (1) shown below, and excludes the other reflected rays, for example.

[Math. 1]

$$\hat{r}_R = \hat{r}_{in} - 2(\hat{n} \cdot \hat{r}_{in})\hat{n} \tag{1}$$

Note that, as illustrated in FIG. 4, the symbol of the unit directional vector $r_R{}^{\wedge}$ is obtained by adding a hat symbol (or a circumflex) to the character string "$r_R$". Since a hat symbol cannot be added to a character string in the text of this specification, it is written as "$r_R{}^{\wedge}$". The same applies to other symbols "$r_{in}{}^{\wedge}$", "$n^{\wedge}$", and "$l^{\wedge}$", "$r_D{}^{\wedge}$", and the like in Expression (2).

In Expression (1), $r_{in}{}^{\wedge}$ represents a unit directional vector indicating the ray incident direction, and $n^{\wedge}$ represents the unit vector (normal vector) in a plane with which the ray intersects. By restricting the reflected-ray emitting direction in this manner, the information processing system 1 can reduce the amount of three-dimensional ray calculation.

Also, the second ray tracing unit 34 causes a three-dimensional ray intersecting the edge of the structural object 703*a* or the like to re-emit in the diffraction direction. At this point of time, on the basis of the Fermat's theorem, the second ray tracing unit 34 leaves a diffracted ray of a unit directional vector $r_D{}^{\wedge}$ that satisfies Expression (2) shown below, and excludes the other diffracted rays, for example.

[Math. 2]

$$\hat{l} \cdot \hat{r}_D = \hat{l} \cdot \hat{r}_{in} \tag{2}$$

In Expression (2), $l^{\wedge}$ represents the unit vector of the edge with which the ray intersects, and $r_{in}{}^{\wedge}$ represents the unit directional vector indicating the ray incident direction. By restricting the diffracted-ray emitting direction in this manner, the information processing system 1 can reduce the amount of three-dimensional ray calculation.

Note that the second ray tracing unit 34 also calculates a reflected ray, a diffracted ray, and the like from a floor surface, as the height h1 of the transmission point 701 and the height h2 of the reception point 702 are added to the two-dimensional ray trace 711 illustrated in FIG. 7.

In step S606, the second ray tracing unit 34 adds a reflected ray and/or a diffracted ray from the ceiling surface to the three-dimensional ray trace obtained in step S605. For example, the second ray tracing unit 34 refers to the building data 102 (or the CAD data 101) and the like, to identify the plane indicating the ceiling of the building, and calculates a ray that starts from the transmission point 701, is reflected or diffracted by the ceiling surface, and reaches the reception point 702.

In step S607, the radio field intensity calculation unit 35 calculates the intensity (the electric field intensity, for example) of the radio wave at the reception point, using all the three-dimensional ray traces determined by the second ray tracing unit 34. For example, the radio field intensity calculation unit 35 acquires, from the environment data 22, information such as the reflectance and transmittance of the radio waves on the respective surfaces of the structural objects and the inside of the building, calculates the reflection coefficients, the diffraction coefficients, and the transmission coefficients of all the retrieved rays, and adds up the electric field intensities of all the rays, to calculate the total electric field intensity. Note that a conventional ray tracing method can be applied to the processing in step S612.

As described above, Example 1 can provide the information processing system 1 that reduces the increase in the amount of calculation in a radio wave propagation simulation, and increases the speed of the radio wave propagation simulation.

Example 2

In Example 2, an example of a diffracted ray calculation process that is performed by the second ray tracing unit 34 to convert a two-dimensional ray trace into a three-dimensional ray trace in step S604 in FIG. 6 is described.

FIG. 8 is a flowchart illustrating an example of a diffracted ray calculation process according to Example 2.

In step S801, the second ray tracing unit 34 determines whether the target ray is a diffracted ray. If the target ray is a diffracted ray, the steps starting from step S802 are executed.

In step S802, the second ray tracing unit 34 determines whether there is a line of sight between the transmission point and the reception point. For example, in a case where a radio wave (a ray) emitted from the transmission point directly reaches the reception point, the second ray tracing unit 34 determines that there is a line of sight between the transmission point and the reception point.

Figure 9A:
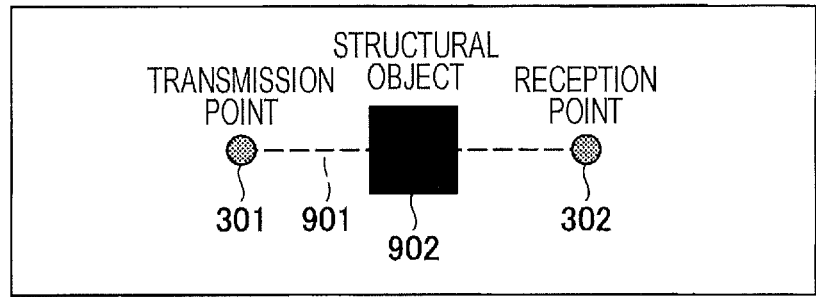
FIG. 9A is a diagram (1) for explaining an example of line-of-sight determination according to Example 2.

FIGS. 9A to 9D are diagrams for explaining an example of line-of-sight determination according to Example 1. For the two-dimensional ray trace determined in step S604 in FIG. 6 in a horizontal plane, the second ray tracing unit 34 determines whether a structural object 902 is present in a route 901 between the transmission point 701 and the reception point 702 as illustrated in FIG. 9A, for example. Here, if the structural object 902 does not exist in the route 901 between the transmission point 701 and the reception point 702, the second ray tracing unit 34 determines that there is a line of sight between the transmission point 701 and the reception point 702.

Figure 9B:
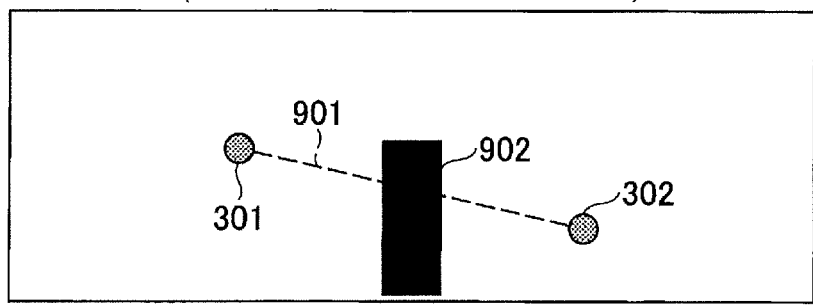
FIG. 9B is a diagram (2) for explaining an example of line-of-sight determination according to Example 2.
Figure 9C:
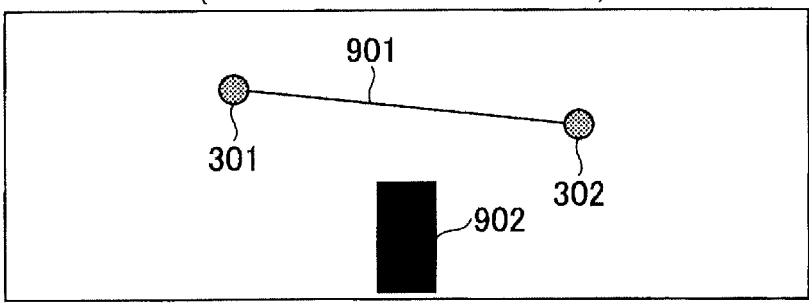
FIG. 9C is a diagram (3) for explaining an example of line-of-sight determination according to Example 2.
Figure 9D:
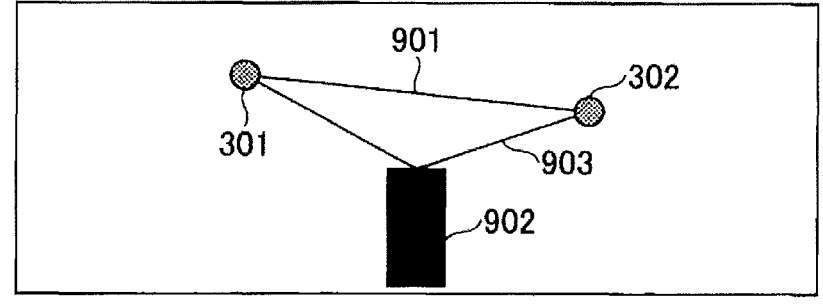
FIG. 9D is a diagram (4) for explaining an example of line-of-sight determination according to Example 2.

If the structural object 902 exists in the route 901 between the transmission point 701 and the reception point 702, on the other hand, the second ray tracing unit 34 performs line-of-sight determination in a vertical plane extending through the transmission point 701 and the reception point 702 as illustrated in FIGS. 9B and 9C, for example. If the structural object 902 exists in the route 901 between the transmission point 701 and the reception point 702 as illustrated in FIG. 9B, for example, the second ray tracing unit 34 determines that there is not a line of sight between the transmission point 701 and the reception point 702. If the structural object 902 does not exist in the route 901 between the transmission point 701 and the reception point 702 as illustrated in FIG. 9C, on the other hand, the second ray tracing unit 34 determines that there is a line of sight between the transmission point 701 and the reception point 702. Note that, in this case, when determining a three-dimensional ray trace, the second ray tracing unit 34 determines a reflected ray 903 that appears due to the upper surface of the structural object 902 as illustrated in FIG. 9D, instead of a reflected ray that appears due to the floor surface.

Although the second ray tracing unit 34 performs the line-of-sight determination in the above description, the present embodiment is not limited to this. For example, the simulation unit 30 may include a line-of-sight determination unit that performs the line-of-sight determination.

Referring now back to FIG. 8, explanation of the flowchart is continued. If there is a line of sight between the transmission point and the reception point in step S802, the second ray tracing unit 34 proceeds to step S803. If there is not a line of sight between the transmission point and the reception point, on the other hand, the second ray tracing unit 34 proceeds to step S804.

When having proceeded to step S803, the second ray tracing unit 34 calculates a diffracted ray that is diffracted at an edge of a structural object or the like as described above with reference to FIG. 7, for example.

When having proceeded to step S804, on the other hand, the second ray tracing unit 34 replaces the structural object present between the transmission point and the reception point with a flat metal plate.

In step S805, the second ray tracing unit 34 determines whether there is a plurality of structural objects between the transmission point and the reception point. If there is not a plurality of structural objects, the second ray tracing unit 34 proceeds to step S806. If there is a plurality of structural objects between the transmission point and the reception point, on the other hand, the second ray tracing unit 34 proceeds to step S807.

When having proceeded to step S806, the second ray tracing unit 34 calculates a diffracted ray that is screen-diffracted by the flat metal plate that has replaced the structural object between the transmission point and the reception point.

When having proceeded to step S807, on the other hand, the second ray tracing unit 34 calculates a diffracted ray for analyzing a plurality of structural objects present between the transmission point and the reception point, using the Bullington model.

Figure 10A:
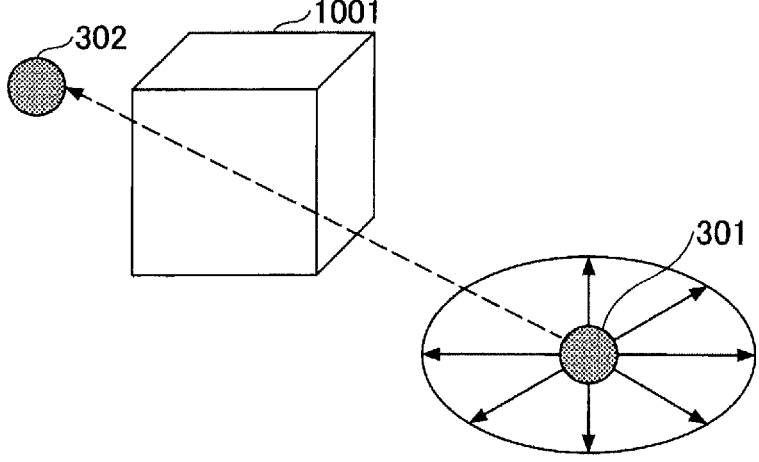
FIG. 10A is a diagram (1) for explaining the process to be performed according to Example 2 in a case where there is not a line of sight.
Figure 10B:
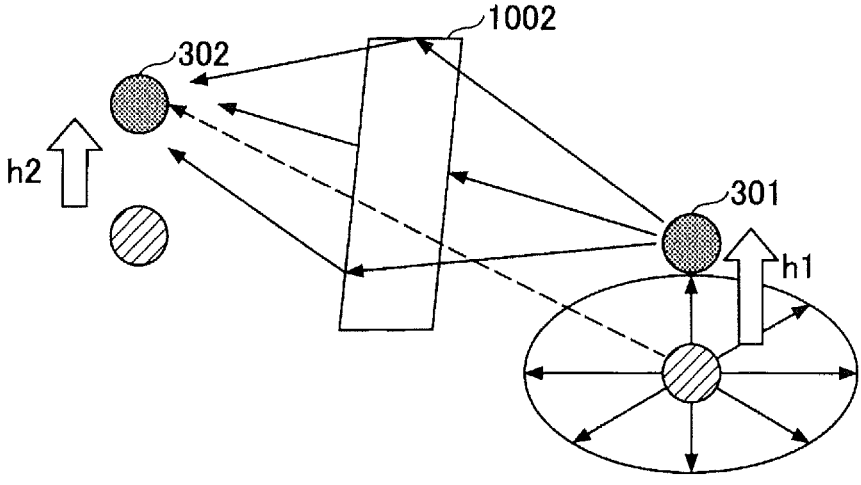
FIG. 10B is a diagram (2) for explaining the process to be performed according to Example 2 in a case where there is not a line of sight.

FIGS. 10A and 10B are diagrams for explaining the process that is performed according to Example 2 in a case where there is not a line of sight. In a case where there is one structural object 1001 between the transmission point 701 and the reception point 702 as illustrated in FIG. 10A, the second ray tracing unit 34 replaces the structural object 1001 with a flat metal plate 1002 as illustrated in FIG. 10B. The second ray tracing unit 34 calculates screen-diffracted waves on the top, the right side, and the left side of the flat metal plate 1002, to determine diffracted rays.

Figure 11:
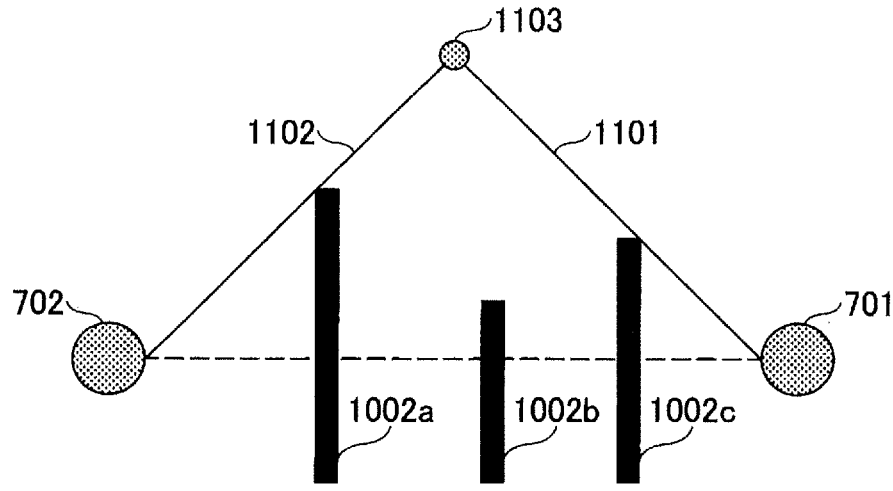
FIG. 11 is a diagram for explaining the process to be performed according to Example 2 in a case where there is a plurality of structural objects.

FIG. 11 is a diagram for explaining an example of the process that is performed according to Example 2 in a case where there is a plurality of structural objects. If there is a plurality of structural objects between the transmission point 701 and the reception point 702, the second ray tracing unit 34 replaces the plurality of structural objects with a plurality of flat metal plates 1002*a*, 1002*b*, and 1002*c*, as illustrated in FIG. 11. The second ray tracing unit 34 adopts the Bullington model, to calculate a diffracted ray that is diffracted by the plurality of flat metal plates 1002*a*, 1002*b*, and 1002*c*.

For example, the second ray tracing unit 34 calculates an imaginary interception point 1103, which is the intersection of a transmission-side limit line of sight 1101 passing through the transmission point 701 and the upper edge of the flat metal plate 1002*c* and a reception-side limit line of sight 1102 passing through the reception point 702 and the upper edge of the flat metal plate 1002*a*. The second ray tracing unit 34 also calculates a diffracted wave diffracted at the imaginary knife edge (Bullington edge) at the imaginary interception point 1103, to determine a diffracted ray. By this method, the second ray tracing unit 34 can determine a diffracted ray that is diffracted by a plurality of structural objects with a smaller amount of calculation.

Through the above process, the second ray tracing unit 34 can speed up the diffracted ray calculation in a case where there is not a line of sight between the transmission point and the reception point.

Example 3

Figure 12:
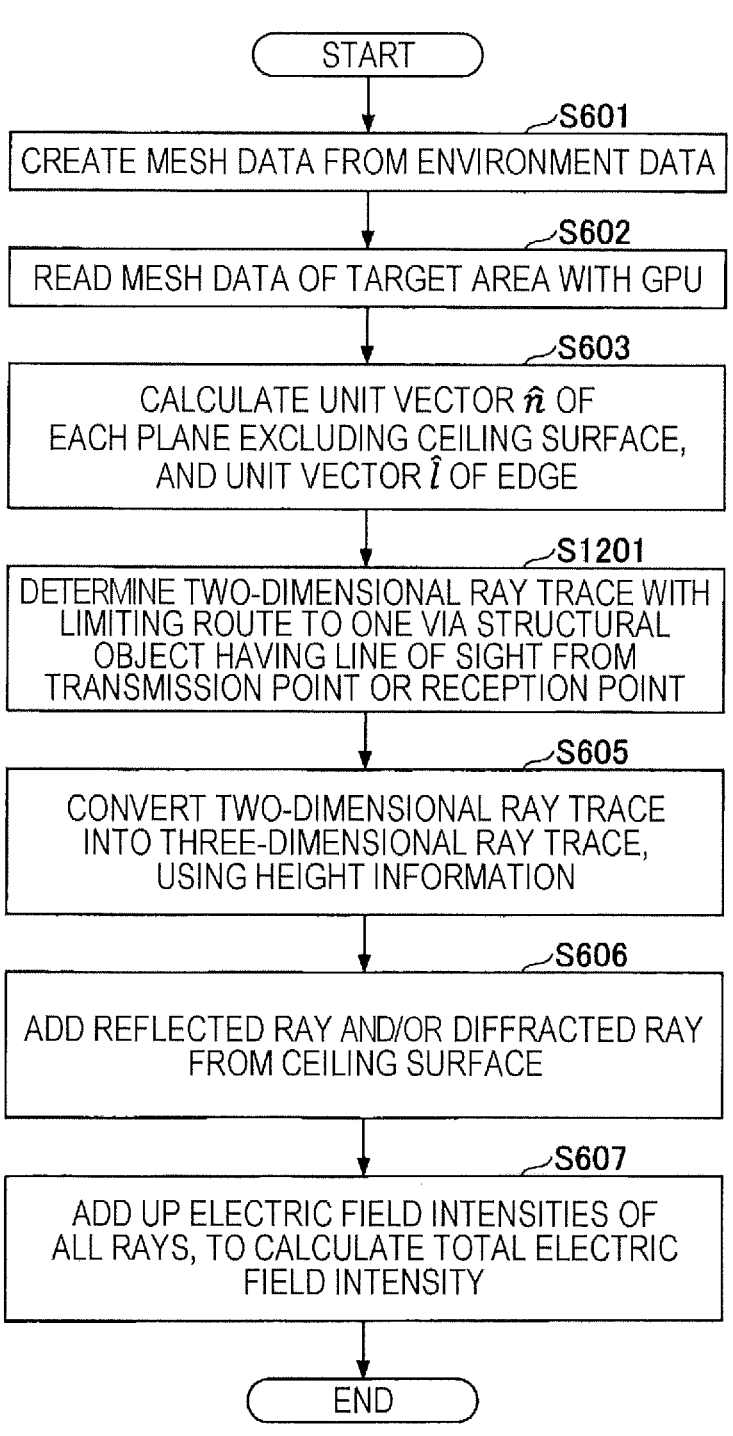
FIG. 12 is a flowchart illustrating an example of a ray tracing process according to Example 3.

FIG. 12 is a flowchart showing an example of a ray tracing process according to Example 3. Note that, among the processes illustrated in FIG. 12, the processes other than step S1201 are the same as those in the ray tracing process according to Example 1 described with reference to FIG. 6, and therefore, the differences from the processes according to Example 1 are mainly described herein.

In step S604 in FIG. 6, the first ray tracing unit 33 determines a two-dimensional ray trace that reaches the reception point from the transmission point within the ranges of the maximum number $N_T$ of transmissions, the maximum number $N_D$ of reflections, and the maximum number $N_D$ of diffractions.

In step S1201 in FIG. 12, on the other hand, the first ray tracing unit 33 determines a two-dimensional ray trace with limiting routes from the transmission point to the reception point via a structural object in the building, to a route from the transmission point to the reception point via a structural object having a line of sight from the transmission point or from the reception point.

For example, the first ray tracing unit 33 identifies a structural object having a line of sight from the transmission point (such a structural object will be hereinafter referred to as a Tx line-of-sight structural object), and a structural object having a line of sight from the reception point (such a structural object will be hereinafter referred to as a Rx line-of-sight structural object), among the structural objects in the building. In a specific example, in a case where the environment data 22 includes three-dimensional point cloud data 103 acquired through LIDAR, the first ray tracing unit 33 may identify a Tx line-of-sight structural object and a Rx line-of-sight structural object, using the point cloud data 103. In another example, the first ray tracing unit 33 may analyze the mesh data 21, or three-dimensional CAD data and the like included in the environment data 22, to identify a Tx line-of-sight structural object and a Rx line-of-sight structural object.

Also, the first ray tracing unit 33 determines a two-dimensional ray trace with limiting routes from the transmission point to the reception point via a structural object in the building, to the following three routes, for example.

1) A route from the transmission point to the reception point via a Tx line-of-sight structural object.
2) A route from the transmission point to the reception point via a Tx line-of-sight structural object and a Rx line-of-sight structural object.
3) A route from the transmission point to the reception point via a Rx line-of-sight structural object.

As a result, the first ray tracing unit 33 can determine the principal ray contributing to estimation of the intensity of the radio wave at the reception point at a higher speed with a smaller amount of calculation.

Note that the above three routes are examples, and various modifications or applications are possible. For example, a Tx line-of-sight structural object and a Rx line-of-sight structural object may be building walls, columns, or the like included in the building data 102.

As described above, according to Example 3, it is possible to provide an information processing system that further prevents an increase in the calculation amount when ray tracing is performed in an environment such as an indoor environment in which many structural objects exist.

Note that, in each of the example of cases described above, ray tracing is performed in an indoor environment. However, the ray tracing method according to the present embodiment can also be applied in a case where ray tracing is performed in an outdoor environment in which the floor is replaced with the ground, and many structural objects exist, for example.

Example Hardware Configuration

The information processing system 1 according to the present embodiment can be formed with a computer that is made to execute a program in which the processing contents described in the present embodiment are written.

The above program can be stored or distributed, being recorded in a computer-readable recording medium (a portable memory or the like). Further, the above program can also be provided through a network such as the Internet or electronic mail.

Figure 13:
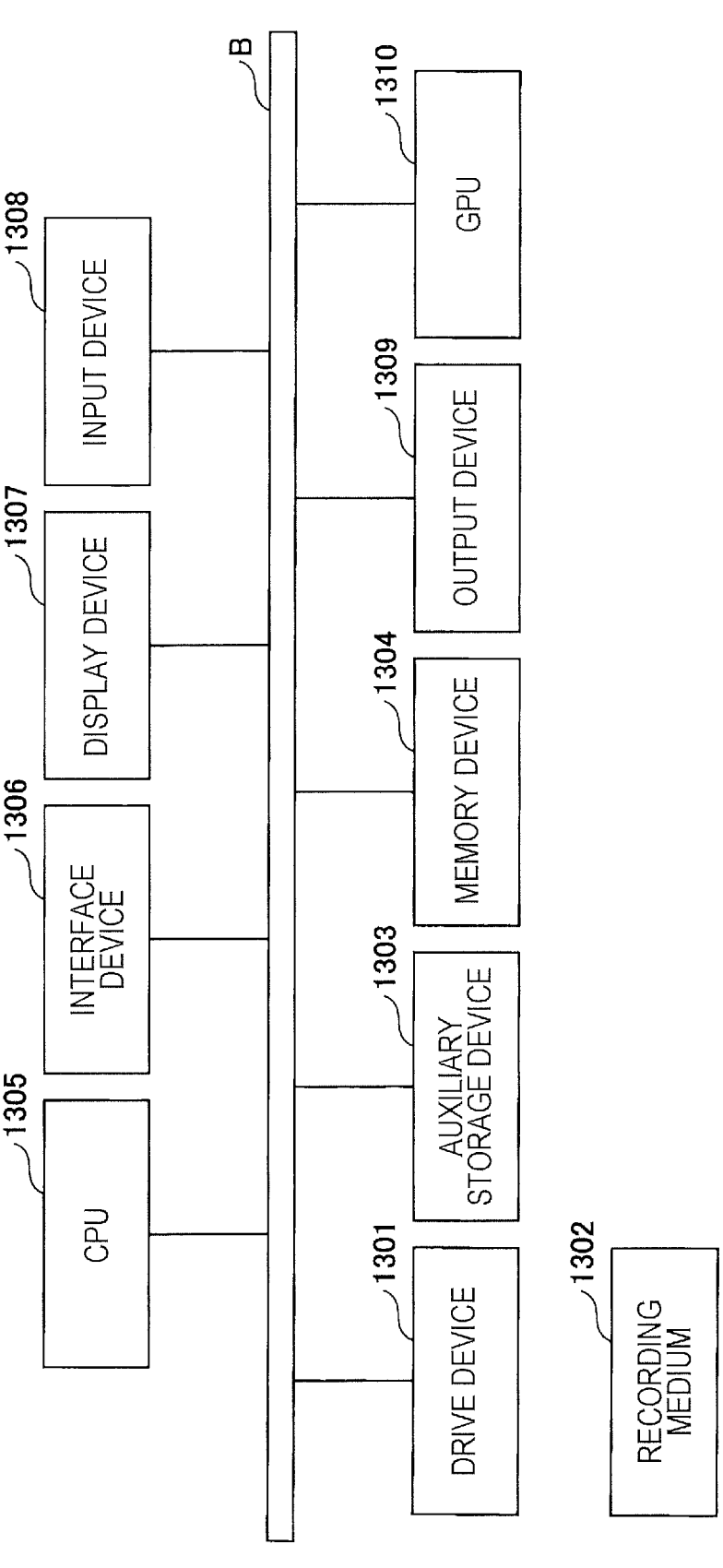
FIG. 13 is a diagram illustrating an example of a hardware configuration of a computer.

FIG. 13 is a diagram illustrating an example of a hardware configuration of a computer. A computer 1300 in FIG. 13 includes a drive device 1301, an auxiliary storage device 1303, a memory device 1304, a CPU 1305, an interface device 1306, a display device 1307, an input device 1308, an output device 1309, and a GPU 1310 that are connected to one another by a bus B.

The program for performing processes in the computer 1300 is provided through a recording medium 1302 such as a CD-ROM or a memory card, for example. When the recording medium 1302 that stores the program is set in the drive device 1301, the program is installed from the recording medium 1302 into the auxiliary storage device 1303 via the drive device 1301. However, the program is not necessarily installed from the recording medium 1302, but may be downloaded from another computer via a network. The auxiliary storage device 1303 stores the installed program, and also stores necessary files, data, and the like.

In a case where an instruction to start the program is given, the memory device 1304 reads the program from the auxiliary storage device 1303, and stores the program therein. In accordance with the program stored in the memory device 1304, the CPU 1305 implements the functions related to the respective components described in the present embodiment. The interface device 1306 is used as an interface for connecting to a network. The display device 1307 displays a GUI or the like according to the program. The input device 1308 is formed with a keyboard and a mouse, buttons, a touch panel, or the like, and is used to input various operation instructions. The output device 1309 outputs a calculation result. Note that the information processing system 1 need not include the display device 1307 and/or the input device 1308. The GPU 1310 is a processor that performs various processes mainly related to image processing (particularly, 3D graphics processing) at a higher speed than the CPU 1305.

Effects of the Embodiment

By the technology according to the present embodiment, it is possible to provide an information processing system that reduces the increase in the amount of calculation in a radio wave propagation simulation, and increases the speed of the radio wave propagation simulation.

Summary of the Embodiment

This specification discloses at least the information processing system, the propagation environment simulation method, and the program in accordance with the respective items listed below.

Item 1

An information processing system including:
an acquisition unit configured to divide a target area into a plurality of meshes of a predetermined size, and acquire mesh data indicating an environment of the target area with height information about the plurality of meshes on a per-mesh basis;
a first ray tracing unit configured to determine a two-dimensional ray trace from a transmission point to a reception point on the basis of the mesh data, a radio wave being transmitted at the transmission point, the radio wave being received at the reception point;
a second ray tracing unit configured to determine a three-dimensional ray trace corresponding to the two-dimensional ray trace, on the basis of the mesh data, and height information about the transmission point and the reception point; and
a radio field intensity calculation unit configured to calculate an intensity of the radio wave at the reception point, using one or more of three-dimensional ray traces determined by the second ray tracing unit.

Item 2

The information processing system of item 1, in which the mesh data has a GPU-readable data format, and the acquisition unit is configured to read the mesh data with a GPU.

Item 3

The information processing system of item 1 or 2, further including:
a division unit configured to divide the target area into a plurality of meshes of the predetermined size;
an extraction unit configured to extract height information about the plurality of meshes on a per-mesh basis, using environment data indicating a position and a shape of an object present in the target area; and a creation unit configured to create the mesh data indicating the height information about the plurality of meshes on a per-mesh basis.

Item 4

The information processing system of any one of items 1 to 3, in which
the mesh data indicates a structural object present in a building and an inner side of the building, excluding a ceiling, as a plurality of planes,
the first ray tracing unit is configured to determine a two-dimensional ray trace from the transmission point at which a radio wave is transmitted in the building to the reception point at which the radio wave is received in the building, on the basis of the mesh data, and
the second ray tracing unit is configured to
determine a three-dimensional ray trace corresponding to the two-dimensional ray trace, on the basis of height information about the transmission point and the reception point, and the mesh data, and
add a reflected ray and a diffracted ray from a ceiling surface of the building to the three-dimensional ray trace, on the basis of data of the building.

Item 5

The information processing system of any one of items 1 to 4, in which the first ray tracing unit is configured to determine the two-dimensional ray trace with limiting a route from the transmission point to the reception point via a structural object, to a route from the transmission point to the reception point via a structural object having a line of sight from the transmission point or the reception point.

Item 6

The information processing system of any one of items 1 to 5, in which the second ray tracing unit is configured to, when determining one of a reflected or a diffracted ray with respect to the three-dimensional ray trace, determines the one of the reflected or the diffracted ray with restricting a launch angle of ray launching.

Item 7

The information processing system of any one of items 1 to 6, in which the second ray tracing unit is configured to, when determining a diffracted ray with respect to the three-dimensional ray trace, determine the diffracted ray with replacing a structural object present between the transmission point and the reception point with a flat metal plate when there is not a line of sight in a route between the transmission point and the reception point.

Item 8

The information processing system of item 7, in which the second ray tracing unit is configured to, when there is a plurality of structural objects between the transmission point and the reception point, use a Bullington model, to determine the diffracted ray that is diffracted by the plurality of structural objects.

Item 9

A radio wave propagation simulation method comprising:
dividing a target area into a plurality of meshes of a predetermined size, and acquiring mesh data indicating an environment of the target area with height information about the plurality of meshes on a per-mesh basis;
determining a two-dimensional ray trace from a transmission point to a reception point on the basis of the mesh data, a radio wave being transmitted at the transmission point, the radio wave being received at the reception point;
determining a three-dimensional ray trace corresponding to the two-dimensional ray trace, on the basis of the mesh data, and height information about the transmission point and the reception point; and
calculating an intensity of the radio wave at the reception point, using one or more of three-dimensional ray traces determined by the determining a three-dimensional ray trace
wherein the dividing, the acquiring, the determining a two-dimensional ray trace, the determining a three-dimensional ray trace, and the calculating are implemented by an information processing system.

Item 10

A program for causing an information processing system to:
divide a target area into a plurality of meshes of a predetermined size, and acquire mesh data indicating an environment of the target area with height information about the plurality of meshes on a per-mesh basis;
determine a two-dimensional ray trace from a transmission point to a reception point on the basis of the mesh data, a radio wave being transmitted at the transmission point, the radio wave being received at the reception point;
determine a three-dimensional ray trace corresponding to the two-dimensional ray trace, on the basis of the mesh data, and height information about the transmission point and the reception point; and
calculate an intensity of the radio wave at the reception point, using one or more of three-dimensional ray traces determined.
Although the present embodiment has been described above, the present invention is not limited to such a specific embodiment, and various modifications and changes can be made within the scope of the present invention described in the claims.

REFERENCE SIGNS LIST 1 information processing system
10 data processing unit
11 division unit
12 extraction unit
13 creation unit
21 mesh data
31 acquisition unit
33 first ray tracing unit
34 second ray tracing unit
35 radio field intensity calculation unit
22 environment data
30 simulation unit
101 CAD data
102 building data 103 point cloud data
1301 drive device
1302 recording medium
1303 auxiliary storage device
1304 memory device
1305 CPU
1306 interface device
1307 display device
1308 input device
1309 output device
1310 GPU

The invention claimed is:

1. An information processing system comprising a processor configured to:
divide a target area into a plurality of meshes of a predetermined size, and acquire mesh data indicating an environment of the target area with height information about the plurality of meshes on a per-mesh basis;
determine a two-dimensional ray trace from a transmission point to a reception point on the basis of the mesh data, a radio wave being transmitted at the transmission point, the radio wave being received at the reception point;
determine a three-dimensional ray trace corresponding to the two-dimensional ray trace, on the basis of the mesh data, and height information about the transmission point and the reception point; and
calculate an intensity of the radio wave at the reception point, using one or more three-dimensional ray traces determined,
when determining a diffracted ray with respect to the three-dimensional ray trace, determine the diffracted ray with replacing a structural object present between the transmission point and the reception point with a flat metal plate when there is not a line of sight in a route between the transmission point and the reception point.

2. The information processing system according to claim 1 wherein
the processor is configured to:
divide the target area into a plurality of meshes of the predetermined size;
extract height information about the plurality of meshes on a per-mesh basis, using environment data indicating a position and a shape of an object present in the target area; and
create the mesh data indicating the height information about the plurality of meshes on a per-mesh basis.

3. The information processing system according to claim 1, wherein
the mesh data indicates a structural object present in a building and an inner side of the building, excluding a ceiling, as a plurality of planes, and
the processor is configured to:
determine the two-dimensional ray trace from the transmission point at which a radio wave is transmitted in the building to the reception point at which the radio wave is received in the building, on the basis of the mesh data,
determine the three-dimensional ray trace corresponding to the two-dimensional ray trace, on the basis of height information about the transmission point and the reception point, and the mesh data, and
add a reflected ray and a diffracted ray from a ceiling surface of the building to the three-dimensional ray trace, on the basis of data of the building.

4. The information processing system according to claim 1, wherein the processor is configured to determine the two-dimensional ray trace with limiting a route from the transmission point to the reception point via a structural object, to a route from the transmission point to the reception point via a structural object having a line of sight from the transmission point or the reception point.

5. The information processing system according to claim 1, wherein the processor is configured to, when determining one of a reflected ray or a diffracted ray, determine the one of the reflected ray or the diffracted ray with restricting a launch angle of ray launching.

6. The information processing system according to claim 1, wherein the processor is configured to, when there is a plurality of structural objects between the transmission point and the reception point, use a Bullington model, to determine the diffracted ray that is diffracted by the plurality of structural objects.

7. The information processing system according to claim 1, wherein the mesh data is generated in the GPU-readable image-data format that serves as an input dataset directly consumed by the GPU for ray-tracing computation, and store the mesh data in the GPU-readable data format.

8. The information processing system according to claim 1, wherein the mesh data has a GPU-readable data format, and the processor is configured to read the mesh data with a GPU.

9. A radio wave propagation simulation method comprising:

dividing a target area into a plurality of meshes of a predetermined size, and acquiring mesh data indicating an environment of the target area with height information about the plurality of meshes on a per-mesh basis;

determining a two-dimensional ray trace from a transmission point to a reception point on the basis of the mesh data, a radio wave being transmitted at the transmission point, the radio wave being received at the reception point;

determining a three-dimensional ray trace corresponding to the two-dimensional ray trace, on the basis of the mesh data, and height information about the transmission point and the reception point; and calculating an intensity of the radio wave at the reception point, using one or more three-dimensional ray traces determined by the determining a second ray trace, wherein the dividing, the acquiring, the determining a two-dimensional ray trace, the determining a three-dimensional ray trace, and the calculating are implemented by an information processing system, and wherein the method further comprises, when determining a diffracted ray with respect to the three-dimensional ray trace, determining the diffracted ray with replacing a structural object present between the transmission point and the reception point with a flat metal plate when there is not a line of sight in a route between the transmission point and the reception point.

10. A non-transitory computer-readable recording medium storing a program for causing an information processing system to:

divide a target area into a plurality of meshes of a predetermined size, and acquire mesh data indicating an environment of the target area with height information about the plurality of meshes on a per-mesh basis;

determine a two-dimensional ray trace from a transmission point to a reception point on the basis of the mesh data, a radio wave being transmitted at the transmission point, the radio wave being received at the reception point;

determine a three-dimensional ray trace corresponding to the two-dimensional ray trace, on the basis of the mesh data, and height information about the transmission point and the reception point; and calculate an intensity of the radio wave at the reception point, using one or more three-dimensional ray traces determined, and when determining a diffracted ray with respect to the three-dimensional ray trace, determine the diffracted ray with replacing a structural object present between the transmission point and the reception point with a flat metal plate when there is not a line of sight in a route between the transmission point and the reception point.

* * * * *